United States Patent [19]
Yamanaka

[11] Patent Number: 6,081,488
[45] Date of Patent: Jun. 27, 2000

[54] OPTICAL HEAD FOR RECORDING AND PLAYING FROM OPTICAL DISC

[75] Inventor: Yutaka Yamanaka, Tokyo, Japan

[73] Assignee: NEC Corporation, Japan

[21] Appl. No.: 08/928,603

[22] Filed: Sep. 12, 1997

[30] Foreign Application Priority Data

Sep. 13, 1996 [JP] Japan ................................. 8-242946

[51] Int. Cl.⁷ ..................................................... G11B 7/00
[52] U.S. Cl. ......................................... 369/44.23; 369/112
[58] Field of Search ............................ 369/44.23, 44.27, 369/110, 112, 94, 118, 58

[56] References Cited

U.S. PATENT DOCUMENTS

| | | | |
|---|---|---|---|
| 5,615,200 | 3/1997 | Hoshino et al. | 369/12 |
| 5,661,711 | 8/1997 | Tanaka et al. | 369/112 |
| 5,703,856 | 12/1997 | Hayashi et al. | 369/112 |
| 5,754,513 | 5/1998 | Yagi et al. | 369/58 |
| 5,835,473 | 11/1998 | Shimozono et al. | 369/112 |

FOREIGN PATENT DOCUMENTS

| | | |
|---|---|---|
| 0236503 | 9/1987 | European Pat. Off. . |
| 0610055 | 8/1994 | European Pat. Off. . |
| 0762403 | 3/1997 | European Pat. Off. . |
| 0786766 | 7/1997 | European Pat. Off. . |
| 61-246934 | 11/1986 | Japan . |
| 56546 | 1/1993 | Japan . |
| 855363 | 2/1996 | Japan . |
| 8203094 | 9/1996 | Japan . |
| 8321067 | 12/1996 | Japan . |
| 9091749 | 4/1997 | Japan . |

OTHER PUBLICATIONS

Keating, "Geometric, Physical, and Visual Optics", 1988, pp. 29–35.

*Primary Examiner*—Thang V. Tran
*Attorney, Agent, or Firm*—Hayes, Soloway, Hennessey, Grossman and Hage, P.C.

[57] ABSTRACT

The configuration of an optical head is such that it enables movement of and setting of the position of a laser light source along an optical axis to either a first position which corresponds to the position for which an objective lens is designed to accommodate an optical disc having a first substrate thickness, and a third position which is between the first position and a second position at which the aberration with respect to an optical disc having a second substrate thickness, which is different than that of the first optical disc, is minimum. By establishing this third position as a position at which not only is there a reduction in aberration with respect to the second optical disc, but also at which there is no significant reduction in the allowable amount of lateral skew of the laser light source from the optical axis, it is possible to prevent a significant worsening of aberration characteristics, even if the laser light source is skewed from the optical axis.

14 Claims, 4 Drawing Sheets

OPTICAL HEAD FOR RECORDING AND PLAYING FROM OPTICAL DISC

BACKGROUND OF THE INVENTION

1. Field of the Invention

The present invention relates to an optical head which is capable of recording onto and playing back from optical disc media having differing substrate thicknesses, such as DVDs (digital video discs) and CDs (compact discs) in an optical disc apparatus.

2. Description of Related Art

In the above-noted type of optical disc apparatus which is generally used, to maintain the surface of the recording medium formed in the order of microns, an optical head is used which forms a minutely small spot onto the recording medium surface through a transparent substrate. In this type of configuration, because a collimated beam passes through a transparent substrate that is a parallel flat plate, a wavefront aberration occurs that is dependent upon the thickness of the parallel flat plate.

The term wavefront aberration used here refers to a skew in the collimated beam from an equiphase surface. If this skew is large, the size of the collimated spot expands to greater than the diffraction limit, preventing good-quality recording and playback characteristics.

Therefore, to form a minutely small spot that is near the diffraction limit onto the recording medium, a lens in the optical head optics system is designed so as to compensate for this wavefront aberration. Recently, it has become possible to include a correction function using a single aspherical lens.

The thickness of the substrate of an optical disc will depend upon the purpose thereof, such as with the substrates of an optical disk, for example, DVDs and CDs. When the substrate thickness varies, because the amount of wavefront aberration compensation varies, in a head that is designed to accommodate a substrate thickness for a specific type of optical disc, it is not possible to compensate for the wavefront aberration of a separate disc having a substrate of a different thickness, making it impossible to perform recording and playback of that type of disc.

To solve this problem in the past, there was a technique proposed whereby the distance between the laser light source 1 and the objective lens 2 was changed, as shown in FIG. 4, thereby enabling a reduction of aberration caused by the difference in substrate thickness.

In this example, the light radiated by the laser light source 1 which is disposed at a first position P1 passes through the objective lens 2, and is collected onto the first optical disc 3. In the case of a second optical disc 4 which has a different substrate thickness, the laser light source 1 is moved to a second position P2 at which the aberration is minimum for the substrate thickness of this optical disc 4, thereby enabling optical disc playback with a minutely small spot.

However, in the above-noted optical head, when moving the laser light source 1 to the second position P2 at which the aberration is minimum with respect to the optical disc 2, because of error in the movement position thereof, the aberration characteristics can actually be worsened.

More specifically, FIG. 3 shows the relationship between the change in the position of the laser light source and the allowable amount of overall wavefront aberration and shift (lateral skew to the outside of the light axis and is referred to a lateral skew hereunder), in an optical system including the objective lens. From this drawing, it can be seen that, accompanying a change in the position of the laser light source, although there exists a position at which the overall aberration is minimum, this is accompanied by a reduction in the allowable lateral shift.

For this reason, when the laser light source 1 moves to the second position P2 in FIG. 4, although the associated aberration is minimum, the reduction in the allowable error under this condition in fact causes a sharp worsening of the aberration characteristics.

In view of the foregoing, an object of the present invention is to provide an optical head which solves the above problem, and which can accommodate optical discs of different substrate thicknesses without a worsening of the aberration characteristics.

SUMMARY OF THE INVENTION

To attain the object of the present invention as mentioned above, the present invention basically has the following technical conception in that as the first aspect of the present invention, an optical head which collects light that is emitted from a laser light source, via an intervening objective lens, onto an optical disk as a minutely small spot, the objective lens being designed to accommodate the substrate thickness of a first optical disc, and the laser light source being at either one of a first position on an optical axis with respect to the objective lens, or a prescribed third actual or virtual position on the optical axis, which is between the first position and a second position on the optical axis that corresponds to a position at which the aberration is minimum with respect to a second optical disc that has a substrate thickness which differs from the substrate thickness of the first optical disc.

And as the second aspect of the present invention, it is provided that a method for recording or reproducing optical information on to or from optical disks each having a separate thickness thereof from each other, utilizing an optical head means in which light that is emitted from a laser light source, is collected via an intervening objective lens, onto an optical disk as a minutely small spot, wherein when a first optical disc is used, the laser light emitted from the laser light source located at a first position on an optical axis with respect to the objective lens, is focused onto the first optical disc, while when a second optical disc having a thickness thereof being different from that of the first optical disc is used, the laser light emitted from the laser light source located at an actual third position or imaginary third position formed on an optical axis with respect to the objective lens, is focused onto the second optical disc.

In the present invention, the objective lens, provided for the purpose of collecting from the light emitted from a laser light source a minutely small spot of light onto an optical disc is designed so as to accommodate a first optical disc substrate thickness, the laser light source being configured so as to be movable or imaginarily settable at a third position on a light axis which is between the above-noted first position on the light axis and a second position which is different from the first position, and at which the aberration with respect to a second optical disc is minimum.

This third position is set so that even if the wavefront aberration with respect to the second optical disc is reduced in comparison with the first position, there is no significant reduction in the amount of allowable lateral skew.

The laser light source is mechanically configured so that it is movable along the optical axis. Another method is to have a hologram element formed by interference of the two spherical waves from the laser light source and the objective lens disposed between the laser light source and the objective lens, the virtual position of the laser light source on the optical axis being changed between the first position and the third position by selection of the hologram element transmitted light and the diffracted light.

In addition, it is possible to dispose a polarizing hologram element which diffracts light of only a specific polarization direction between the laser light source and the objective lens, the virtual position of the laser light source on the optical axis being changed between the first position and the third position by selection of the polarized light emitted from the hologram element.

DETAILED DESCRIPTION OF THE PREFERRED EMBODIMENTS

Figure 1:
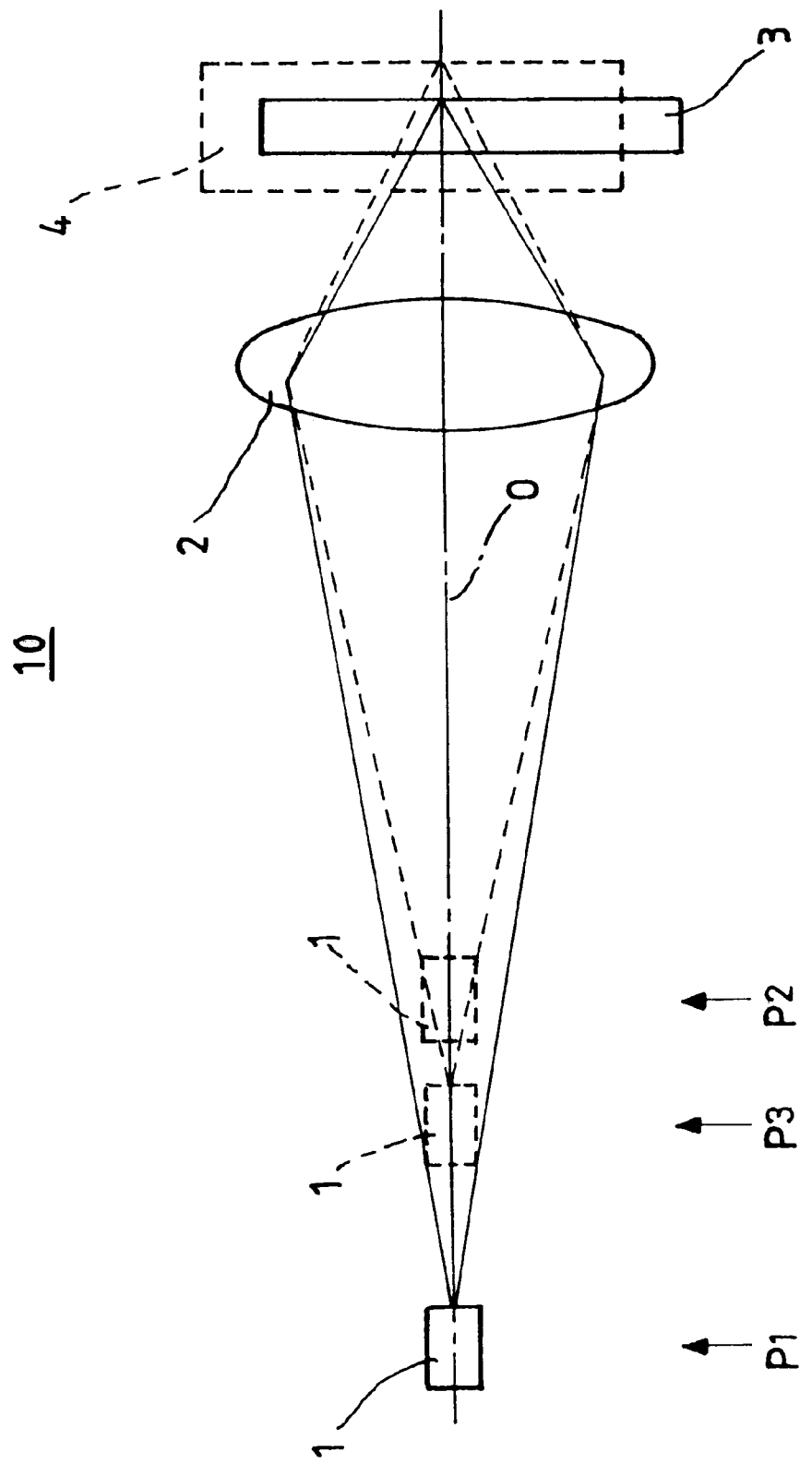
FIG. 1 is a drawing which shows the configuration of the first embodiment of the present invention.

Embodiments of present invention are described below, with reference being made to the relevant accompanying drawings. FIG. 1 is a drawing which illustrates the configuration of the of the first embodiment of the present invention.

FIG. 1 shows one specific embodiment of an optical head of the present invention in which it is shown that an optical head 10 which collects light that is emitted from a laser light source 1, via an intervening objective lens 2, onto an optical disk 3 as a minutely small spot, the objective lens 2 being designed to accommodate the substrate thickness of a first optical disc 3, and the laser light source 1 being at either one of a first position P1 on an optical axis 0 with respect to the objective lens 2, or a prescribed third act1ual or virtual position P3 on the optical axis 0, which is between the first position P1 and a second position P2 on the optical axis 0 that corresponds to a position at which the aberration is minimum with respect to a second optical disc 4 that has a substrate thickness which differs from the substrate thickness of the first optical disc 3.

The embodiment of the present invention will be explained more precisely with reference to FIGS. 1 to 2, as follows;

The light emitted by the laser light source 1 which is disposed on the optical axis at the first position P1 passes through the objective lens 2 and is collected onto the first optical disc 3.

Although it is not shown in the drawing, light which is reflected from the optical disc 3 is reflected by a beam splitter or half-mirror or the like, and is detected by a light detector to effect playback from the disc.

In the case of a second optical disc 4 which has a substrate thickness that differs from that of the first optical disc 3, the above-noted laser light source 1 is moved along the optical axis to a different position.

Figure 4:
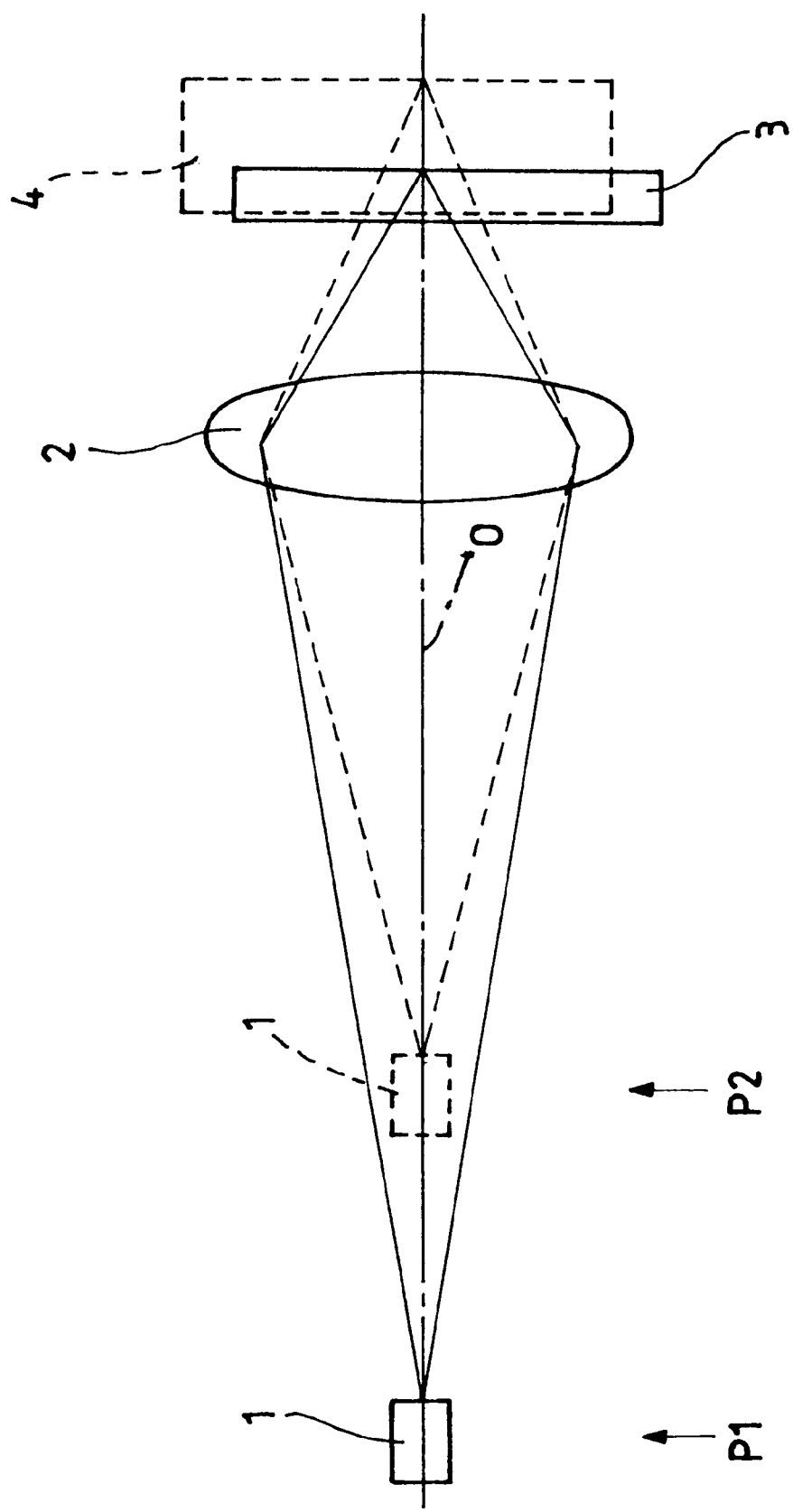
FIG. 4 is a drawing which shows an example of the configuration of an optical head of the past.

When doing this, the second position P2, which is indicated in the drawing by a broken line, similar to the case shown in FIG. 4, is the position at which the aberration is minimum for the second optical disc. In the present invention, the laser light source 1 is moved to an intermediate third position P3, which does not reach the second position P2.

This third position P3 will be described with regard to the characteristics of overall wavefront aberration and allowable lateral skew with respect to a change in the position from that shown in FIG. 2. These characteristics are for the case in which the substrate thickness is greater than the thickness for which the objective lens is designed.

As shown by the solid line in this drawing, when the light source is moved toward the objective lens, at a certain distance, all of the total wavefront aberration in the collimated beam is minimum.

However, the allowable amount of lateral skew, indicated by the broken line, decreases. In the present invention, the light source is set to a position at which the overall wavefront aberration is not very much worsened, and at which a certain amount of allowable lateral skew is achieved, this being the third position P3.

As mentioned above, in the optical head of the present invention, the first position of the laser light source is used when the first optical disk is used while the third position of the laser light source is used when the second optical disk is used.

Further in the optical head of the present invention, the third position is a position at which not only is the wavefront aberration smaller than at the first position with respect to the second optical disc, but also there is not a significant reduction in the amount of allowed lateral skew comparing with that at the first position.

In an specific embodiment of the optical head in the present invention, the laser light source is moved along the optical axis by a mechanical mechanism.

On the other hand, the laser light source is imaginarily placed at the third position along the optical axis by a hologram element used in the optical head.

It is apparent from the above-mentioned explanation of the present invention, a hologram element that is formed by interference between two spherical waves is inserted between the laser light source and the objective lens, and wherein by selecting between transmitted light and diffracted light of the hologram element, the third position of the laser light source on the optical axis is virtually set.

Further, in the optical head of the present invention, the hologram element that diffracts only light having a certain polarization direction is inserted between the laser light source and the objective lens, and wherein by selecting polarized light that is emitted from the hologram element, the third position of the laser light source on the optical axis is virtually set.

In terms of an example with specific values, with an optimum numerical aperture (NA) of 0.6 with respect to an optical disc with a substrate thickness of 0.6 mm, using an objective lens having a focal length of 3.3 mm, and a light source set designed distance of 33 mm, consider the case in which an optical disc has a substrate thickness of 1.2 mm.

If the distance between the objective lens and the light source is set to 25 mm, it is possible to obtain a minimum amount of aberration of approximately 0.004 $\lambda$ rms. However, if the amount of allowable lateral skew at this position is 0.05 $\lambda$ or less, the narrow value of 0.3 mm or less results.

If the distance between the objective lens and the light source is set to 23 mm, there is a light deterioration of aberration to approximately 0.02 $\lambda$, even on the optical axis.

However, the amount of allowable lateral skew can be increased to 0.5 mm.

Therefore, in the case of a second optical disc 4 having a different substrate thickness, by moving the laser light source 1 from the first position P1 to the third position P3, not only is the wavefront aberration with respect to this second optical disc 4 reduced, but it is also possible to suppress an accompanying reduction in the amount of allowable lateral skew.

Therefore, at the third position P3, even if the laser light source 1 is skewed from the optical axis, because it is possible to achieve some allowance in the value of this skew, it is possible to achieve good-quality playback without a sharp deterioration in the aberration characteristics.

In place of a finite-type lens, it is possible to use a combination of a collimator lens and an infinite-type lens for the objective lens 2. Additionally, while it is possible to use a mechanical system for moving the laser light source 1 along the optical axis 0, it is also possible to insert an optical component to change the equivalent optical distance.

Figure 2:
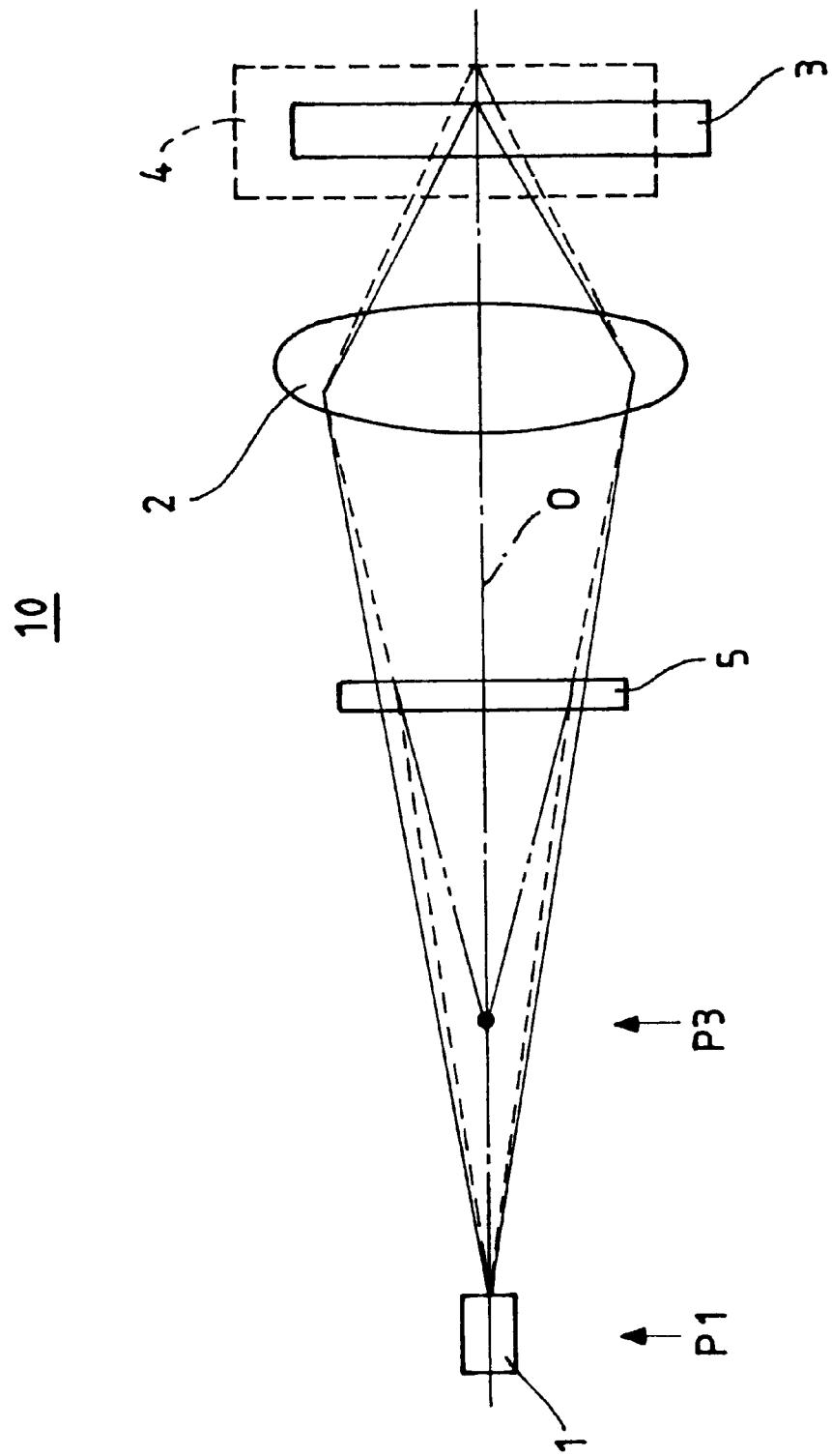
FIG. 2 is a drawing which shows the configuration of the first embodiment of the present invention.
Figure 3:
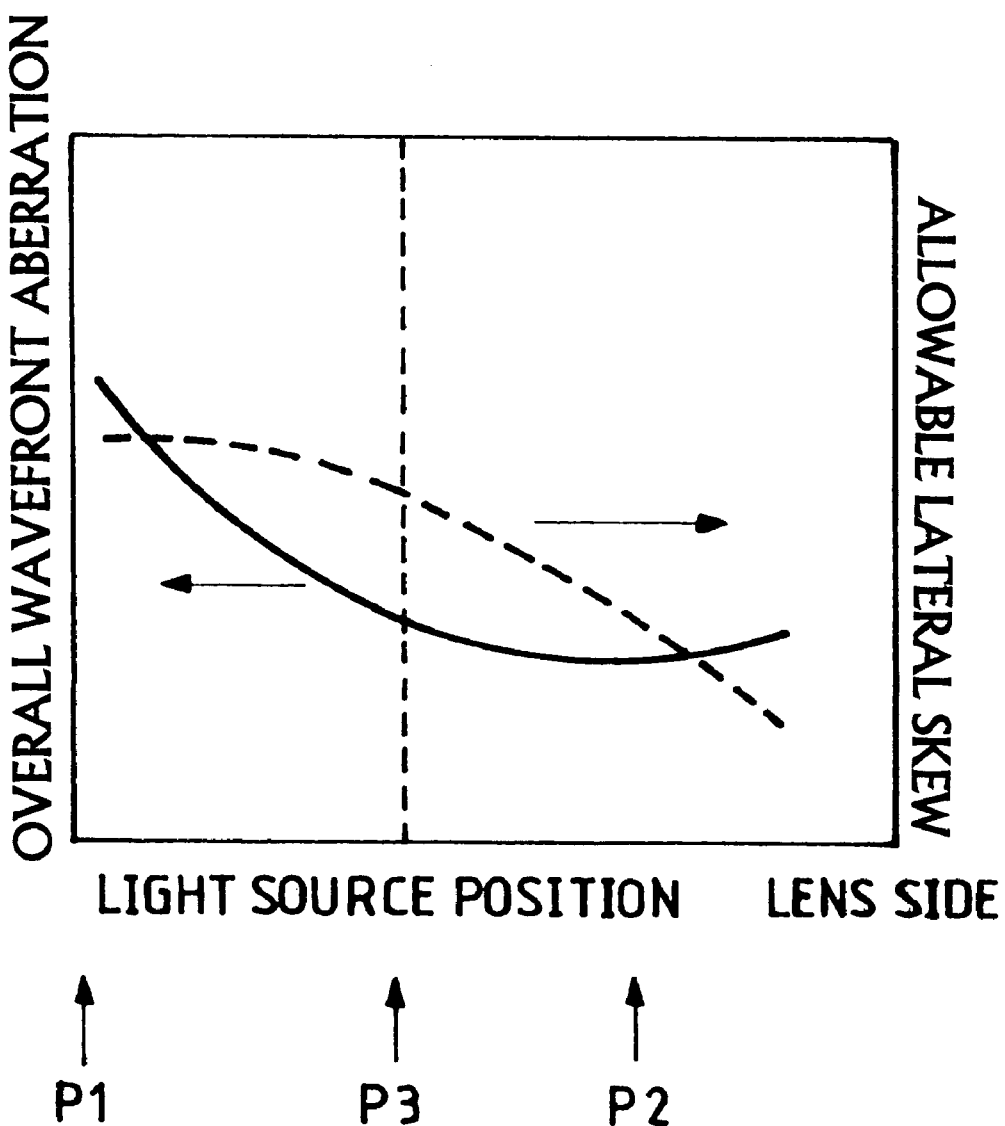
FIG. 3 is a drawing which shows the relationship between the laser light source position, the spherical aberration, and the allowable amount of lateral shift.

For example, FIG. 2 shows an embodiment in which a hologram element is used. In this drawing, elements which are the same as shown in FIG. 1 are assigned the same reference numerals.

In the system shown in FIG. 2, the light transmitted through the hologram element 5 corresponds to the first optical disc 3, and the diffracted light from the hologram element 5 corresponds to the second optical disc 4, and when using the diffracted light, the light from the laser light source at the first position P1 is moved to the virtual third position P3 with respect to the objective lens 2, this being equivalent to emitting light at that position.

By doing this, without actually moving the laser light source 1, it is possible to alleviate wavefront aberration and also to prevent an accompanying reduction in the allowable lateral skew.

In this embodiment of the present invention, even in the case in which laser light source 1 positioned at the first position P1 is skewed from the optical axis 0, it is possible to prevent a worsening of the aberration characteristics when playing back from a second optical disc 4.

With this configuration, because the laser light source is not actually moved, a movement mechanism therefor is not necessary, thereby enabling a simplification of the optical head.

The pattern of the above-noted hologram element 5 can be formed as an interference pattern between the spherical wave from the first position P1 and the spherical wave from the third position P3, thereby making it easy to form.

Additionally, if the hologram element is one which has polarization characteristics that diffracts only light of a specific polarization, by switching the polarized light impinging upon the hologram element using a half-wavelength plate or a liquid crystal element or the like, it is possible in effect to switch the position of the laser light source to between the first position P1 and the third position P3 in accordance with the optical disc of interest.

As apparent from the above-mentioned explanation, in the present invention, it is also provided a method for recording or reproducing optical information on to or from optical disks each having a separate thickness thereof from each other, utilizing an optical head means in which light that is emitted from a laser light source, is collected via an intervening objective lens, onto an optical disk as a minutely small spot, wherein when a first optical disc is used, the laser light emitted from the laser light source located at a first position on an optical axis with respect to the objective lens, is focused onto the first optical disc, while when a second optical disc having a thickness thereof being different from that of the first optical disc is used, the laser light emitted from the laser light source located at a third position on an optical axis with respect to the objective lens, is focused onto the second optical disc, after the laser light source had moved thereto from the first position.

And further another embodiment of the present invention is such that a method for recording or reproducing optical information on to or from optical disks each having a separate thickness thereof from each other, utilizing an optical head means in which light that is emitted from a laser light source, is collected via an intervening objective lens, onto an optical disk as a minutely small spot, wherein when a first optical disc is used, the laser light emitted from the laser light source located at a first position on an optical axis with respect to the objective lens, is focused onto the first optical disc, while when a second optical disc having a thickness thereof being different from that of the first optical disc is used, the laser light emitted from an virtual laser light source assumed to be located at a third position on an optical axis with respect to the objective lens, is focused onto the second optical disc.

As described in detail above, according the present invention, because the configuration is such that it is possible to selectively position the laser light source at either the first position on the optical axis, corresponding to the objective lens position for the first optical disc, and a third position on the optical axis, corresponding to the position at which the aberration for the second optical disc, which has a substrate thickness that is different than that of the first optical disc, is minimum, by setting this third position P3 as a position at which there is a reduction in the aberration but at which there is not a significant reduction in the allowable lateral skew, it is possible to implement an optical head which, in addition to enabling the formation of a proper light spot on optical discs having differing substrate thicknesses, does not cause a deterioration of the aberration characteristics even if the laser light source is skewed from the optical axis.

What is claimed is:

1. An optical head capable of recording or reproducing optical information onto or from optical disc media having differing substrate thicknesses from each other by collecting light that is emitted from a laser light source, via an intervening objective lens, onto an optical disc as a minutely small spot, said objective lens being designed to accommodate the substrate thickness of a first optical disc, when said laser light source is at a specific prescribed first position on an optical axis with respect to said objective lens, said objective lens, when used with a second optical disc of a different thickness than the thickness of the first optical disc, having a design which will give minimum aberration when said objective lens is placed in a second position on said optical axis, and a locator for positioning said light source at a specific prescribed actual or virtual third position between said first and second positions on said optical axis, said third position being a position at which not only is the wavefront aberration smaller than at said first position with respect to said second optical disc, but also there is not a significant reduction in the amount of allowed lateral skew compared with that at said first position.

2. An optical head according to claim 1, wherein said laser light source is moved along said optical axis by a mechanical mechanism.

3. An optical head according to claim 1, wherein said laser light source is imaginarily existed at the third position along said optical axis by a hologram element used in said optical head.

4. An optical head according to claim 1, wherein a hologram element that is formed by interference between two spherical waves is inserted between said laser light source and said objective lens, and wherein by selecting between light transmitted light and diffracted light of said hologram element, said third position of said laser light source on said optical axis is virtually set.

5. An optical head according to claim 1, wherein a hologram element that diffracts only light having a certain polarization direction is inserted between said laser light source and said objective lens, and wherein by selecting polarized light that is emitted from said hologram element, said third position of said laser light source on said optical axis is virtually set.

6. A method for recording or reproducing optical information onto or from optical disks each having differing substrate thicknesses from each other, utilizing an optical head in which light that is emitted from a laser light source, is colleted via an intervening objective lens, onto an optical disk as a minutely small spot, wherein when a first optical disc is used, said laser light emitted from said laser light source is located at a specific prescribed first position on an optical axis with respect to said objective lens, and is focused onto said first optical disc, while when a second optical disc having a thickness thereof being different from that of said first optical disc is used, said objective lens, when used with said second optical disc, having a design which will give minimum aberration when said objective lens is placed in a second position on said optical axis, locating said laser light emitted from said laser light source at a specific prescribed actual or virtual third position on an optical axis with respect to said objective lens, focusing said laser light onto said second optical disc, after said laser light source has moved to said third position from said first position, said third position being a position at which not only is the wavefront aberration smaller than at said first position with respect to said second optical disc, but also there is not a significant reduction in the amount of allowed lateral skew compared with that at said first position.

7. A method for recording or reproducing optical information on to or from optical discs each having a separate thickness thereof from each other according to claim 6, wherein, said laser light is emitted from a virtual laser light source assumed to be located at said third position on an optical axis with respect to said objective lens, is focused onto said second optical disc.

8. An optical head capable of recording or reproducing optical information onto or from optical disk media having differing substrate thicknesses from each other by collecting light that is emitted from a laser light source, via an intervening objective lens, onto an optical disc as a minutely small spot, said objective lens being designed to accommodate the substrate thickness of a first optical disc, and said laser light source being at either one of a specific first position on an optical axis with respect to said objective lens, or a specific prescribed third actual or virtual position on said optical axis, which is between said first position and a second position on said optical axis that corresponds to a position at which the aberration is minimum with respect to a second optical disc that has a substrate thickness which differs from the substrate thickness of said first optical disc, and wherein said third position of said laser light source is used when said second optical disc is used.

9. An optical head capable of recording or reproducing optical information onto or from optical disk media having differing substrate thicknesses from each other by collecting light that is emitted from a laser light source, via an intervening objective lens, onto an optical disk as a minutely small spot, said objective lens being designed to accommodate the substrate thickness of a first optical disc, and said laser light source being at either one of a specific first position on an optical axis with respect to said objective lens, or a specific prescribed third actual or virtual position on said optical axis, which is between said first position and a second position on said optical axis that corresponds to a position at which the aberration is minimum with respect to a second optical disc that has a substrate thickness which differs from the substrate thickness of said first optical disc, and wherein said first position of said laser light source is used when said first optical disc is used.

10. An optical head according to claim 9, wherein said third position is a position at which not only is the wavefront aberration smaller than at said first position with respect to said second optical disc, but also there is not a significant reduction in the amount of allowed lateral skew comparing with that at said first position.

11. An optical head according to claim 9, wherein said laser light source is movable along said optical axis by a mechanical mechanism.

12. An optical head according to claim 9, wherein said laser light source is imaginarily existed at the third position along said optical axis by a hologram element used in said optical head.

13. An optical head according to claim 9, wherein a hologram element that is formed by interface between two spherical waves is inserted between said laser light source and said objective lens, and wherein by selecting between light transmitted light and diffracted light of said hologram element, said third position of said laser light source on said optical axis is virtually set.

14. An optical head according to claim 9, wherein a hologram element that diffracts only light having a certain polarization direction is inserted between said laser light source and said objective lens, and wherein by selecting polarized light that is emitted from said hologram element, said third position of said laser light source on said optical axis is virtually set.

* * * * *